US011885530B2

(12) United States Patent
Padberg et al.

(10) Patent No.: US 11,885,530 B2
(45) Date of Patent: Jan. 30, 2024

(54) ELECTRIC HEATING DEVICE (71) Applicant: BENTELER AUTOMOBILTECHNIK GMBH, Paderborn (DE)

(72) Inventors: Michael Padberg, Arnsberg (DE); Sven Przybylski, Paderborn (DE); Ulrich Rusche, Werl (DE)

(73) Assignee: BENTELER AUTOMOBILTECHNIK GMBH, Paderborn (DE)

(*) Notice: Subject to any disclaimer, the term of this patent is extended or adjusted under 35 U.S.C. 154(b) by 274 days.

(21) Appl. No.: 17/382,632

(22) Filed: Jul. 22, 2021

(65) Prior Publication Data
US 2022/0026108 A1 Jan. 27, 2022

(30) Foreign Application Priority Data

Jul. 23, 2020 (EP) .................................. 20187487

(51) Int. Cl.
*F24H 3/00* (2022.01)
*B01J 19/00* (2006.01)
*F28F 3/04* (2006.01)
*H05B 3/32* (2006.01)

(52) U.S. Cl.
CPC .......... *F24H 3/002* (2013.01); *B01J 19/0013* (2013.01); *F28F 3/048* (2013.01); *H05B 3/32* (2013.01); *B01J 2219/00132* (2013.01); *F28F 2250/102* (2013.01); *H05B 2203/016* (2013.01); *H05B 2203/022* (2013.01)

(58) Field of Classification Search
CPC ................... F24H 3/002; B01J 19/0013; B01J 2219/00132; F25F 3/048; F25F 2250/102; H05B 3/32; H05B 2203/016; H05B 2203/022

See application file for complete search history.

(56) References Cited

U.S. PATENT DOCUMENTS

| | | | | |
|---|---|---|---|---|
| 4,976,929 A | * | 12/1990 | Cornelison | ........ B01D 53/9454 422/177 |
| 5,410,875 A | | 5/1995 | Tanaka et al. | |
| 5,433,926 A | * | 7/1995 | Swars | ................... F01N 13/009 422/174 |
| 2012/0151747 A1 | * | 6/2012 | Andres | .................. H10N 10/01 29/592.1 |
| 2017/0273146 A1 | | 9/2017 | Everly et al. | |

FOREIGN PATENT DOCUMENTS

| | | |
|---|---|---|
| DE | 8916179 U1 | 8/1994 |
| DE | 4307431 A1 | 9/1994 |

OTHER PUBLICATIONS

European Search Report for European U.S. Appl. No. 20/187,487 dated Sep. 9, 2020; 14pp.

* cited by examiner

*Primary Examiner* — Syed O Hasan
(74) *Attorney, Agent, or Firm* — HAUPTMAN HAM, LLP (57) ABSTRACT

An electric heating device in an exhaust gas system, the device having an outer circumferential, circular, housing, wherein a rib structure is arranged in the housing. The rib structure can be heated by applying an electric current. The rib structure is arranged with rib rows parallel to one another in the housing, wherein the parallel-arranged rib rows are arranged such that they are electrically connected to one another in series or in parallel.

17 Claims, 9 Drawing Sheets

ELECTRIC HEATING DEVICE

RELATED APPLICATION(S)

The present application claims priority of European Application Number 20187487.2 filed Jul. 23, 2020, the disclosure of which is hereby incorporated by reference herein in its entirety.

FIELD

The present disclosure relates to an electric heating device in an exhaust gas system.

BACKGROUND

To comply with legislation and market and customer expectations, internal combustion engines today are designed for maximum efficiency and therefore produce as little heat as possible.

At variance with this is the rapid heating of the exhaust gas components after a cold start and the maintenance of this temperature range during the usual test cycles in order to ensure optimum reaction conditions for converting harmful exhaust gas constituents into harmless elements.

In catalytic converters, this light-off starts from ca. 180° C., the reaction rate increases with the temperature. Since future licensing restrictions evaluate the exhaust gas composition immediately after a cold start, the light-off temperature should be reached as quickly as possible.

To this end, heating elements are used which enable active thermomanagement of the exhaust gas system within certain limits. These heating elements are currently usually spirally wound from thin sheet metal honeycomb structures (fin structures).

The separation of the conductors (honeycomb strands) is ensured by an air gap. The overall design is strengthened by high-temperature soldering. The electrical insulation of the entire heating matrix usually takes place via ceramic pins (support pins), wherein these are pushed into the catalytic converter body.

Such a heating device is known, for example, from EP 2 802 752 B1.

SUMMARY

The object of the present disclosure is to demonstrate a heating device for an exhaust gas system, which can be produced in a cost-effective and simple manner but at the same time provides a highly effective heating power in order to be able to meet future demands for rapid external heating of the exhaust gas flow and to optionally realize creative degrees of freedom in terms of the mutual arrangement of the exhaust gas components.

The above-mentioned object is achieved by an electric heating device in an exhaust gas system.

The electric heating device in an exhaust gas system can also be referred to as an exhaust gas system heating device or, alternatively, as a catalytic converter heating device. The electric heating device an outer circumferential, circular housing. The housing is, for example, a radially circularly circumferential sheet metal housing, which has an outer jacket. This can then be integrated in an exhaust gas system, connected upstream of an exhaust gas post-treatment component, for example a catalytic converter, in the exhaust gas flow direction.

A rib structure is arranged in the housing itself. This rib structure can be electrically heated, i.e., designed for resistance heating. Consequently, the rib structure can be heated by applying an electric current. The rib structure or the plates or the plate from which the rib structure is formed can therefore also be referred to as a heating conductor.

Within the scope of the disclosure, three different design variants of the rib structure are possible.

A first variant provides that the rib plate is formed in one piece and from a single material. The rib plate is formed in one piece and from a single material, but again divided into a carrier plate and a fin plate. As mentioned, these are formed in one piece and from a single material and heat up together as a result of electric resistance heating when a current is applied.

A second variant provides that the fin plate and the carrier plate are produced separately and they are coupled to one another with material fit, for example by soldering or spot welding. When a current is applied, the current flows through both the fin plate and the carrier plate and they both heat up as a result of the applied current.

A third variant provides that the rib structure is produced in two parts, by a fin plate and a carrier plate. These are in turn coupled to one another. However, when a current is applied, the current flows only through the carrier plate and this heats up as a result of resistance heating. The fin plate coupled to the carrier plate heats up as a result of heat conduction, via the arrangement or coupling points.

Common to all variants is that, owing to the exhaust gas flowing past, the heat of the rib structure is output to the exhaust gas as a result of convection.

Electrical connections are provided. In this case, the electrical connections reach through the outer housing so that they can be coupled to corresponding electrical connections outside the housing.

The housing and the rib structure are themselves produced from a steel material. This steel material is thermally resistant to the occurring exhaust gas temperatures of up to 1000° and above. The rib structure is formed from an electrically conductive steel material, which has a corresponding ohmic resistance so that, when an electric current is applied, the rib structure heats up and the heat is transmitted to the exhaust gas flowing past as a result of the convection which occurs. The exhaust gas post-treatment component on which the thus heated exhaust gas impinges is connected downstream in the flow direction.

According to the disclosure, rib rows are now arranged in the rib structure. These rib rows are arranged locally parallel to one another. The locally parallel-arranged rib rows are electrically connected in series or in parallel. The rib rows are designed to be linear.

According to the disclosure, owing to mutually parallel-arranged rib rows, the rib rows can be produced separately and then inserted into the housing.

The individual rib rows and the ribs in the rib rows can also be referred to as fins or heating fins. As a result of the locally mutually parallel-arranged rib rows then being electrically connected to one another in parallel or in series, an optimum current flow is realized such that the rib rows are uniformly heated and a correspondingly uniform heat transfer to the exhaust gas post-treatment component connected downstream takes place.

So that the rib rows themselves can be arranged locally parallel to one another, they can firstly be produced separately and independently from the housing. This is performed on the one hand for a rib row in one-piece and single-material form. However, a carrier plate or a current conductor plate can be formed. A rib layer, also referred to as a fin layer or rib plate, is then arranged on the current conductor plate itself. The coupling can be realized, for example, with material fit by resistance spot welding or by soldering. The current conductor plate itself is formed, for example, from a material which heats up resistively, i.e., as a result of resistance heating. The heat is then transferred to the fin layer via heat conduction. The fin layer increases the surface area available for the heat transmission and therefore transfers the heat to the exhaust gas flowing past.

All rib rows are likewise on the one hand formed in one piece and from a single material. For example, the current-conducting plate can be bent from a single material in one piece, for example, in a meandering manner. A current connection is then provided at the respective ends in the housing, so that a voltage can be applied so that current flows through one current conductor plate for heating purposes.

Alternatively, each rib row can be produced and arranged separately from one another. In this case, a respective rib row is then produced separately. Contact elements and/or spacers are arranged at the ends of each rib row.

The contact element itself can be formed, for example, by a respective contact plate. The contact plate itself ensures a physical contact and, at the same time, also a spacing. However, the contact plate is furthermore formed from an electrically conductive material and therefore serves both as a physical spacer and an electrical connector.

Alternatively, the current-conducting plates can also be elongated at the ends and a respective lug can then be formed, wherein the lugs of two mutually adjacent current conductor plates are coupled, for example, via material-fitting coupling. Two neighboring rib rows are therefore electrically connected.

In turn, bracing plates can also be formed as connectors which are, for example, C-shaped in cross-section. These would then be arranged as a third structural part between two rib rows and would connect these electrically to one another.

In addition, spacers can also be formed between rib rows. These spacers are then formed from an electrically insulating material, for example, from ceramic. In a at least one embodiment, these spacers are coupled to the housing such that they reach fully to partially through the housing. The spacers are formed as spacer plates or ceramic plates. They protrude inwards in the housing in the horizontal direction between two rib rows and maintain a physical spacing here. At the same time, the ceramic plates reach partially through the housing and have an opening here through which a holding means, for example a wire, is guided. The wire is then coupled to the outer side of the housing so that simplified assembly is possible.

A further component part of the disclosure provides that the longitudinal axis, in the exhaust gas flow direction of the heating element, can be arranged at an angle of greater than 1 degree with respect to the longitudinal axis of the catalytic converter. The angle is greater than 2, 3, degrees, or greater than 5 degrees. The angled arrangement is smaller than 30 degrees overall. This is achieved in that the rib rows are positioned in the housing of the heating element by holding rods themselves. The holding pins between the heating element and the catalytic converter connected downstream can be fully dispensed, which is why a problem-free physical decoupling and also any geometrical arrangement can be realized. The housing itself has a different cross-sectional geometry to the catalytic converter. Therefore, ceramic catalytic converters can also be used, upstream of which a heating element is connected.

A holding element is provided in the housing so that the rib rows themselves are arranged in a stationary fixed position in the housing. The holding element reaches through the rib rows for this purpose. The holding element is formed as a holding rod. Two holding rods are in turn arranged at a parallel spacing from one another in the housing. To this end, the rib rows have, for example, a respective punched hole through which the holding rods reach. The holding rods themselves can be formed from an electrically insulating material, for example, from a ceramic material. The corresponding sleeves are provided in the rib rows. These are ceramic sleeves. These sleeves are then at a respective spacing. A holding rod then reaches through the sleeves themselves; for example, this holding rod can be formed from a steel material, for example, a stainless high-grade steel material.

Alternatively, respective spacer sleeves themselves reach inside one another and are therefore formed as a modular plug-in system. A plurality of sleeves then form a holding rod.

The sleeves are then pushed inside one another and therefore maintain the mutual parallel spacing of the rib rows whilst also holding the rib row stationary in the exhaust gas flow direction, in the housing. A type of high-grade steel rivet or high-grade steel sleeve can be placed at the respective ends for the purpose of coupling, for example welding, the spacers to the housing.

So that homogenous heating takes place over the entire cross-section, the rib rows have a varying width in their longitudinal direction. The width is greater in the region of the holding rod. The holding rod results in a smaller heatable surface area being present in the rib row itself. This would therefore be linked to a lower heat transfer to the exhaust gas in the region of the holding rod. As a result of the fact that the rib row is designed to be larger here in terms of its own width, an equally large area can be provided for the heat transmission. The current conductor cross-section in the rib row is thus likewise designed to be the same. As a result, homogenous heating of the flowing exhaust gas can therefore be realized over the entire cross-sectional area.

In at least one embodiment, a smaller cross-sectional area is formed, such that fewer ribs are arranged, in an end region of a respective rib row in relation to a center region. The center region extends over a large proportion of the length of the rib plate itself, over more than 50%, more than 60%, over 70%, more than 80%, or more than 90% of the length of the rib plate itself. However, the remaining 10% or less in a respective end region then has a smaller area available for the heat transmission compared to the center region. A heat accumulation in the respective end region of the housing can therefore be avoided. Thus, a more homogenous heating of the flowing exhaust gas over the entire cross-section can be achieved.

BRIEF DESCRIPTION OF THE DRAWINGS

Further features, characteristics, and aspect of the present disclosure are described in the following figures. These serve for easy understanding of the disclosure. In the figures.

DETAILED DISCLOSURE

Figure 1:
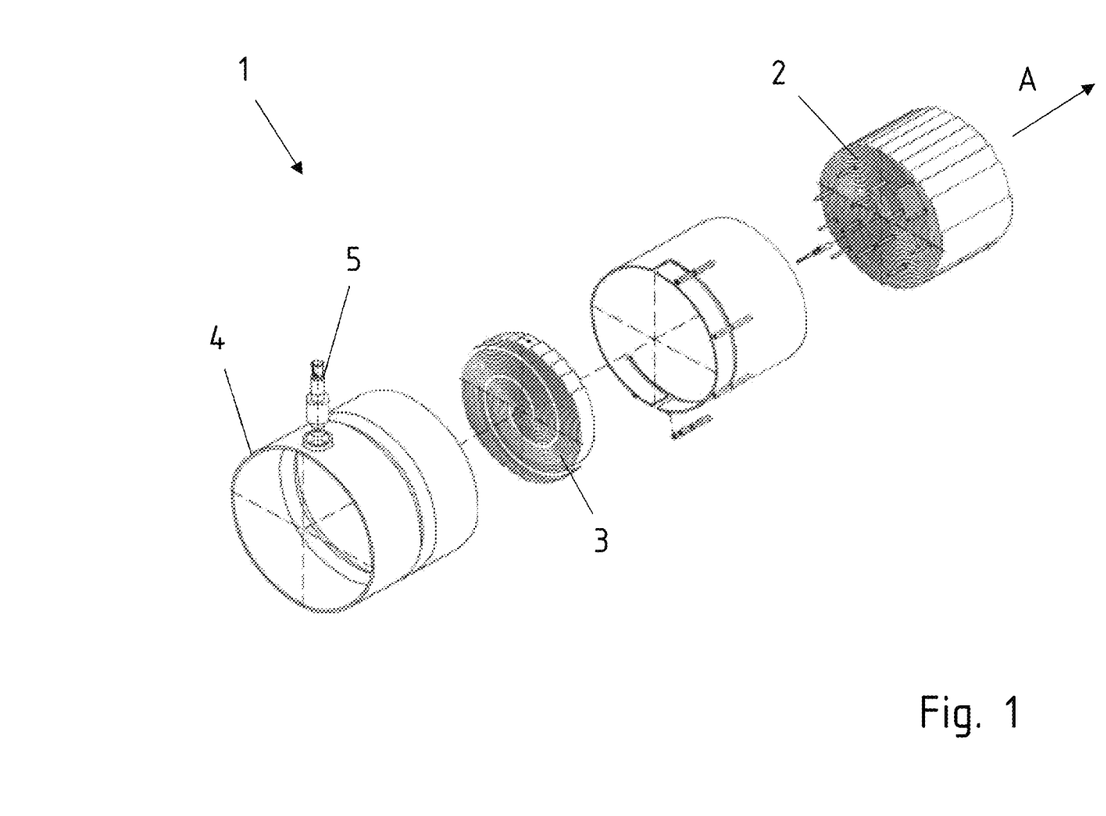
FIG. 1 shows a partial detail of an exhaust gas jet according to at least one embodiment.

FIG. 1 shows a partial detail of an exhaust gas system in an exploded illustration. An exhaust gas post-treatment component in the form of a catalytic converter 2 is illustrated herein. In the exhaust gas flow direction A, a heating coil in the form of a heating device 3 is connected upstream of the catalytic converter 2. This heating coil is wound in a meandering manner. Within the scope of this disclosure, a meandering path is understood to mean a meandering path or zig-zag path.

An outer housing 4, in which the heating coil is inserted, is furthermore illustrated, and this housing 4 has an electrical connection 5 in order to apply an electric current to the heating coil.

Figure 2:
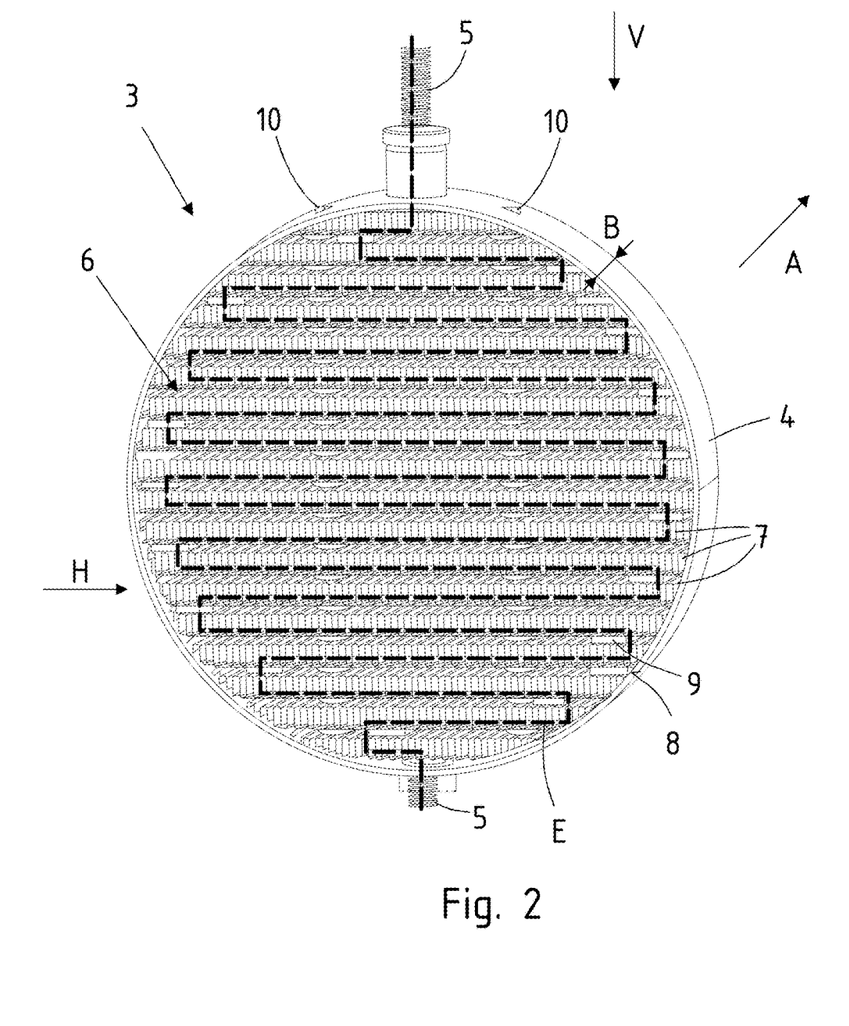
FIG. 2 shows a perspective view of the heating device according to at least one embodiment.

FIG. 2 shows a perspective view of a heating device 3. This has an outer housing 4. The housing 4 is a radially circumferential sheet metal jacket. This can have a small width B in the exhaust gas flow direction A. However, the housing 4 can also be designed to be considerably longer in the exhaust gas flow direction, as illustrated here. Two electrical connections 5 are furthermore provided for applying an electric current to the rib structure 6 arranged in the heating device 3. According to the disclosure, individual rib rows 7 are arranged in the heating device 3. As seen locally, the rib rows 7 are arranged parallel above one another relative to a horizontal direction H illustrated here.

Figure 3:
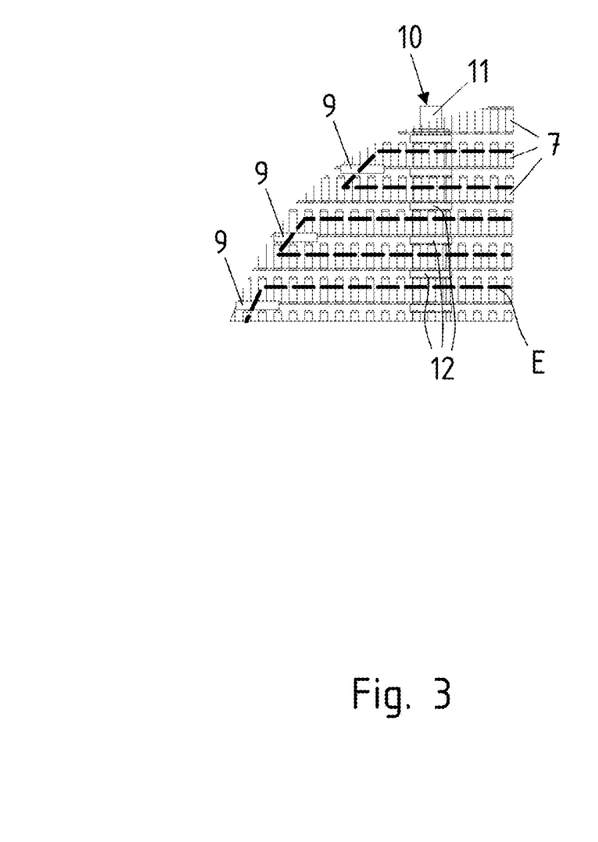
FIG. 3 shows an enlarged illustration of the rib rows in a partial sectional view according to at least one embodiment.

The individual rib rows 7 are now electrically connected to one another in series so that the electric current flow E, likewise illustrated by a dashed line, is produced in a meandering manner. To this end, contact plates 9 are arranged in the respective end regions 8 of the rib rows 7, which is also illustrated in FIG. 3, which shows an enlarged illustration of the rib rows 7 in a partial sectional view. The contact plates 9 are only arranged between every second rib row 7 in each case, so that the meandering electric current flow E is produced.

So that the rib rows 7 are themselves held in the housing 4, a holding element in the form of a holding rod 10, in this exemplary embodiment in the form of two holding rods 10, is furthermore provided. The holding rod 10 extends through all rib rows 7 relative to the vertical direction V and is coupled to the housing 4 at the top and bottom in each case, as illustrated in FIG. 2. The rib rows 7 are therefore arranged in a fixed position in the exhaust gas flow direction A and at a parallel spacing from one another.

As illustrated in FIG. 3, the holding rod 10 can be formed from a metallic inner rod 11 and, for example, ceramic spacer sleeves 12, wherein a spacer sleeve 12 is itself associated with each rib row 7.

Figure 4:
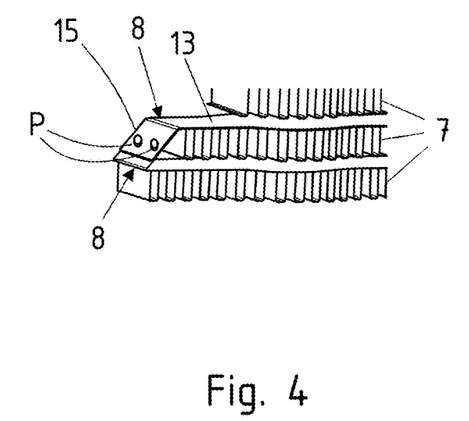
FIG. 4 and FIG. 5 show schematic illustrations of different couplings of the individual rib rows according to at least one embodiment.
Figure 5:
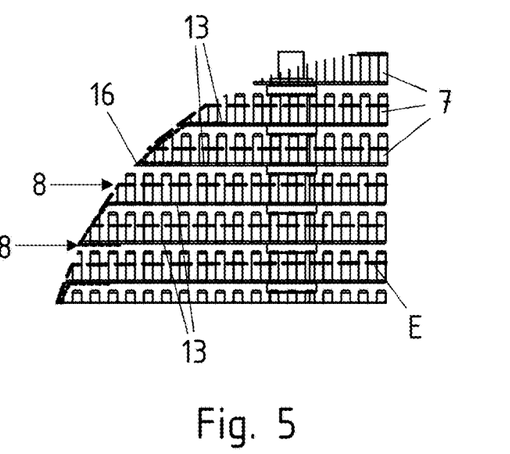
Figure 6:
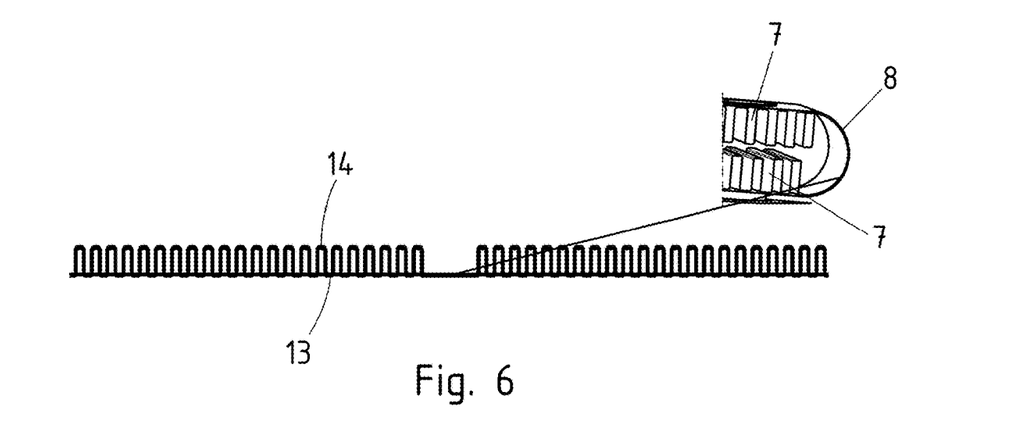
FIG. 6 shows a two-part illustration of the rib rows according to at least one embodiment.

According to FIG. 4 and FIG. 5, different mutual couplings of the individual rib rows 7 are illustrated schematically. As illustrated in FIG. 6, the rib rows 7 themselves are formed in two parts. These have a current-conducting plate 13 and a rib plate 14, also known as a fin plate, arranged thereon. The current-conducting plate 13 and rib plate 14 are then coupled, for example, with material fit via a soldering procedure or the like. According to embodiment variants of FIG. 6, two rib rows 7 can be bent in their end region 8 as a result of a bending procedure. Each rib row 7 can also be produced separately. As already mentioned in the description, all rib rows 7 are produced from one piece and are then produced in a bending technique and extend in a meandering manner.

According to FIG. 4, the individual rib rows 7 are coupled to one another in their respective end region 8 via a contact lug 15. This means that the current-conducting plate 13 is designed to be longer, is bent and is coupled one to another, for example, via a spot weld P or the like.

According to the design variant of FIG. 5, the rib rows 7 are coupled to one another in their end regions 8 via a bracing plate 16. This bracing plate 16 is itself formed in a C shape, for example. The bracing plate 16 then connects two rib rows 7 and current-conducting plates 13 to one another in the end regions 8 in each case, but always leaves out a coupling inbetween so that a meandering electric current flow E again results in an electrical series connection of the rib rows 7 here.

Figure 7A:
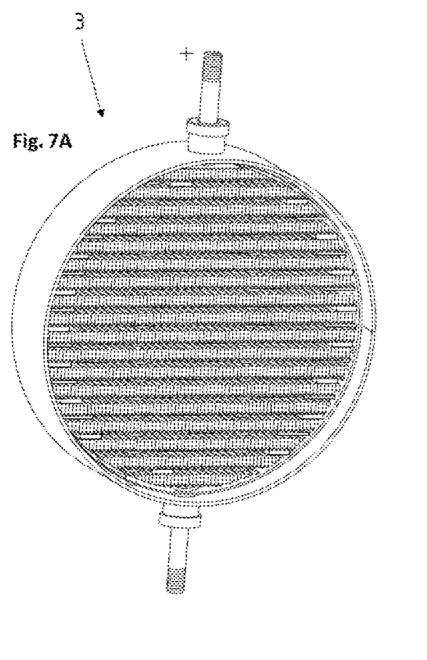
FIG. 7A shows a perspective view analogously to FIG. 2 according to at least one embodiment.
Figure 7B:
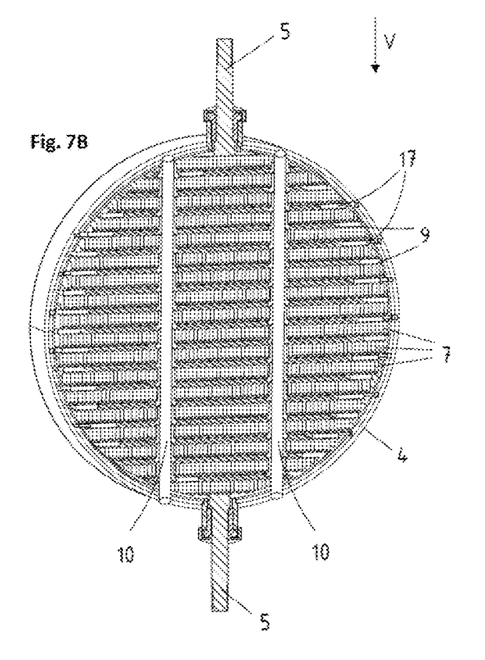
FIG. 7B shows a longitudinal sectional view with respect to FIG. 7A according to at least one embodiment.

FIG. 7A and FIG. 7B show a perspective view—according to FIG. 7A, analogously to FIG. 2 only without showing the current flow. FIG. 7B shows a longitudinal sectional view through FIG. 7A. In the longitudinal sectional view, the holding rods 10 are arranged in a fixed position with respect to one another, reaching through the individual rib rows, relative to the vertical direction V. The electrical insulation with respect to the housing 4 is present at the electrical connections 5; the electrical connection is consequently connected to the rib structure in a current-conducting manner but is arranged to be electrically insulated from the housing 4. The contact plates are, on the one hand, arranged in the respective end regions. Additional spacer plates 17 are arranged between them; an additional spacer plate 17 is arranged for every second rib row 7 in each case. The spacer plate 17 is produced from a ceramic material.

Figure 8A:
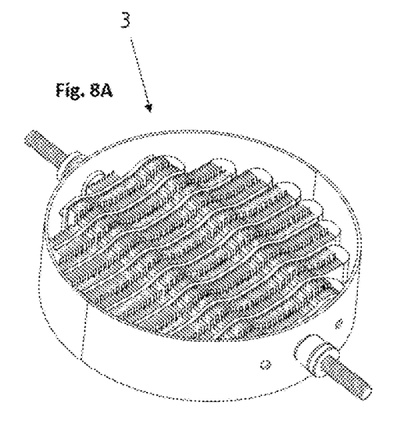
FIG. 8A and FIG. 8B show design variants of the heating device according to one or more embodiments.
Figure 8B:
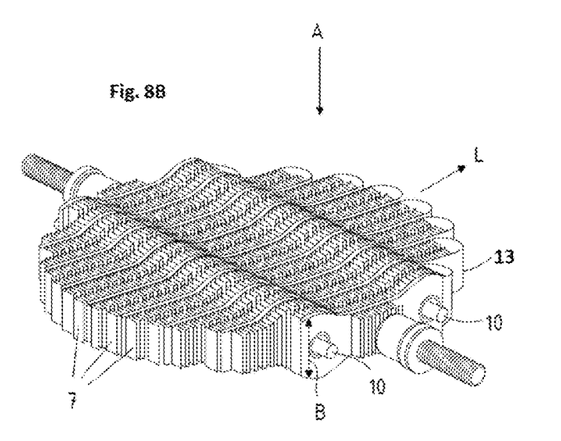

FIG. 8A and FIG. 8B show a design variant of the heating device 3. In this case, respective rib rows 7 are in turn connected to one another in a meandering manner via a continuous current-conducting plate 13. Alternatively, the connections, already arranged in FIG. 3, FIG. 4, and FIG. 5, can also be produced in the end region 8 between two adjacent rib rows 7. However, in this case, the width B of the rib rows 7, as measured in the exhaust gas flow direction A, is designed to vary. This means that the width B changes in the longitudinal direction L of the rib rows 7. The width B itself is measured in the exhaust gas flow direction A. The width is therefore designed to be greater in the region of the holding rods 10. The same area is therefore effectively also available in the region of the holding rods 10 so that substantially the same heat transmission can be observed over the entire cross-section of the heating device 3 and an exhaust gas flow which is heated uniformly in cross-section can be generated.

Figure 9:
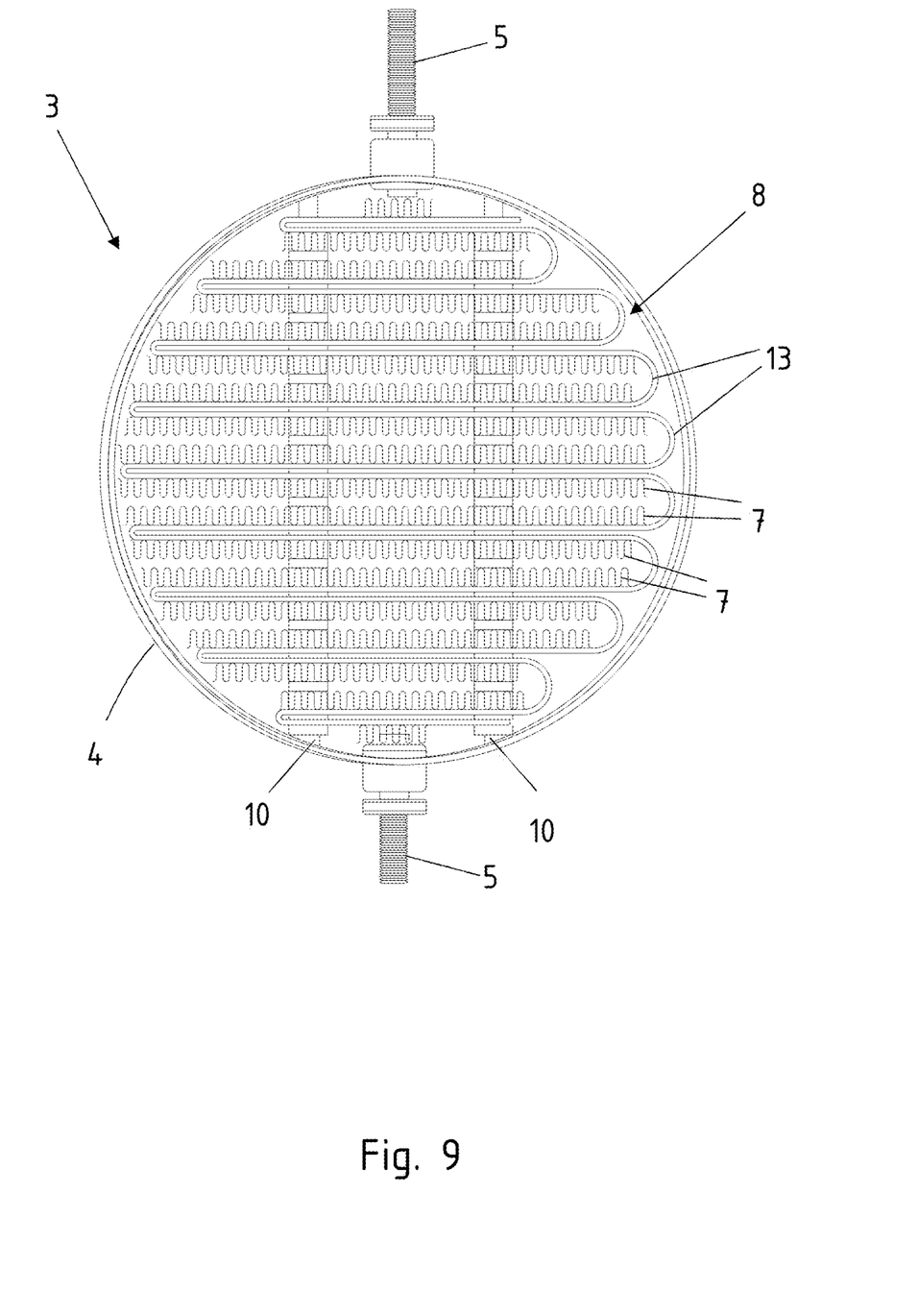
FIG. 9 shows embodiment variants.

FIG. 9 shows at least one embodiment variant. In this case, a continuous current-conducting plate 13 is also folded or bent in one piece. Two rib rows 7 are directed such that they are parallel-facing one another, wherein two layers of the current-conducting plate 13 are subsequently in turn arranged at a spacing from one another, albeit without a rib row 7, in turn followed by two rib rows 7 arranged parallel to one another. This enables simple production during a bending procedure of the rib structure arranged in the housing 4. This is in turn held by the holding rods 10 and connected to the electrical connections 5.

As is shown at least on the right-hand side of FIG. 9, the density of the ribs is designed to be lower in the respective end region 8 of the rib rows 7. A possibly turbulent flow and/or compaction of the flow can result in excessive heating in the end region of the housing 4 here, which can be compensated or avoided by a lower density of the ribs in the end region 8.

FIG. 10A, FIG. 10B, FIG. 10C, and FIG. 10D show the design with the holding rods 10, wherein the holding rods 10 are not formed continuously in one piece here, but by respective plug-in sleeves 18. A respective ceramic plug-in sleeve 18 can therefore fix the respective rib row 7 in position with form fit as well as electrically insulate rib row 7 from another. The plug-in sleeve 18 can therefore function simultaneously as a spacer and as an electrical insulator. A metallic sleeve 19, for example, can be arranged at the ends of the holding rods 10 in order to be coupled to the housing 4. This embodiment variant also has a continuous current-conducting plate 13 between the rib structures. However, this is arranged in a meandering manner in each case, so that a rib row is arranged parallel to the next rib row 7 on the current-conducting plate 13 in each case. The spacer sleeves 12 can therefore be inserted during the folding procedure and are held by the mutually bent rib rows 7 themselves. The overall structure can then be subsequently inserted into the housing 4 and fixed in position with form fit by the sleeves 19.

Figure 10A:
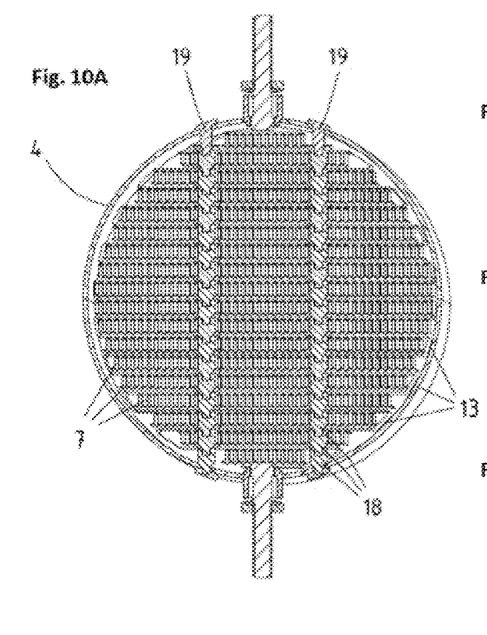
FIG. 10A to FIG. 10D show a design with the holding rods according to one or more embodiments.
Figure 10B:
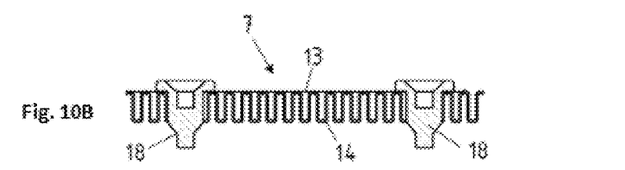
Figure 10C:
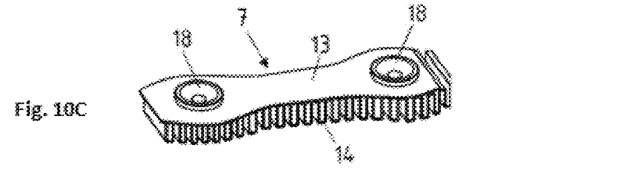
Figure 10D:
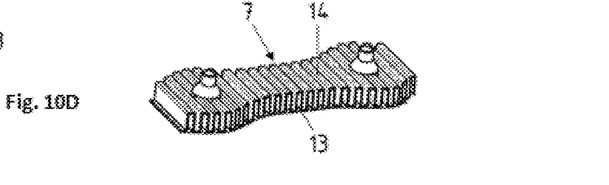

FIG. 10B, FIG. 10C, and FIG. 10D show a respective longitudinal sectional view, perspective top and bottom view of such a rib row 7. The rib row 7 has a current-conducting plate 13 and a rib plate 14. Indicated therein are the spacer sleeves 12 as ceramic sleeves, which simultaneously realize electrical insulation as well form-fitting positional fixing. The current-conducting plate 13 and the rib plate 14 according to the overall disclosure can be formed from a high-grade steel material, which has a thickness or wall thickness of 0.1 to 0.2, or 0.15 mm.

Figure 11A:
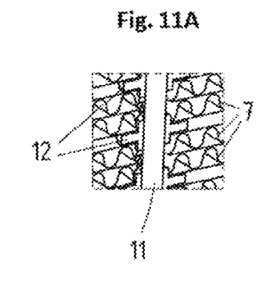
FIG. 11A and FIG. 11B show different holding rods according to one or more embodiments.
Figure 11B:
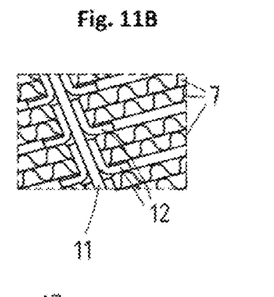

In contrast, FIG. 11A and FIG. 11B show an embodiment variant in which a respective rod 11 is formed to reach through the rib rows 7 in one piece. Respective spacer sleeves 12 are arranged as electrical insulators here, which spacer sleeves space the individual rib rows 7 with respect to one another with form fit and electrically insulate them from one another.

Figure 12:
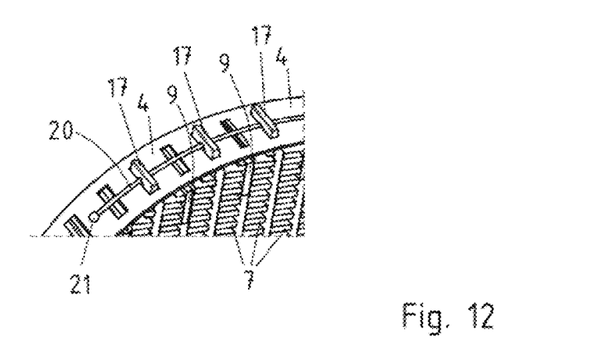
FIG. 12 shows spacers, fastened to the housing according to at least one embodiment.

FIG. 12 shows a further design variant of the present disclosure. In this case, contact plates for the respective rib rows 7 are arranged in the end region, specifically between every second rib row 7. Spacer plates 17, as ceramic plates, are then furthermore also arranged between every second rib row 7 in each case. They are arranged here such that they reach partially through the housing 4 and have a hole so that they are reached-through outside the housing 4 and are held in a fixed position by means of a weld spot 21. The spacer plates 17 can therefore be subsequently inserted into the housing 4 and fixed in position here with form fit.

Figure 13:
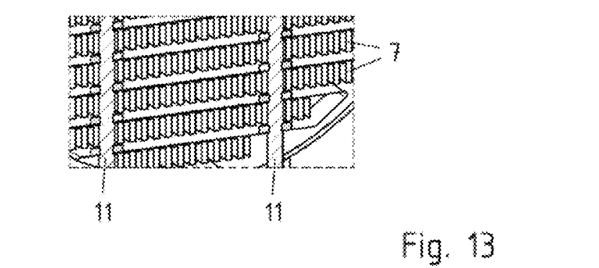
FIG. 13 shows two holding rods made from ceramic according to at least one embodiment.

FIG. 13 shows a further design variant of the disclosure. The respective rod 11 is formed as a ceramic rod here, so that is arranged holding the rib rows 7 at a spacing with form fit but, at the same time, from in electrically insulating fashion. The entire product can be produced separately, consequently the rib structure and then are inserted into the housing. Pre-assembly can also take place and then overall soldering of the entire structure can take place in a soldering device.

Figure 14:
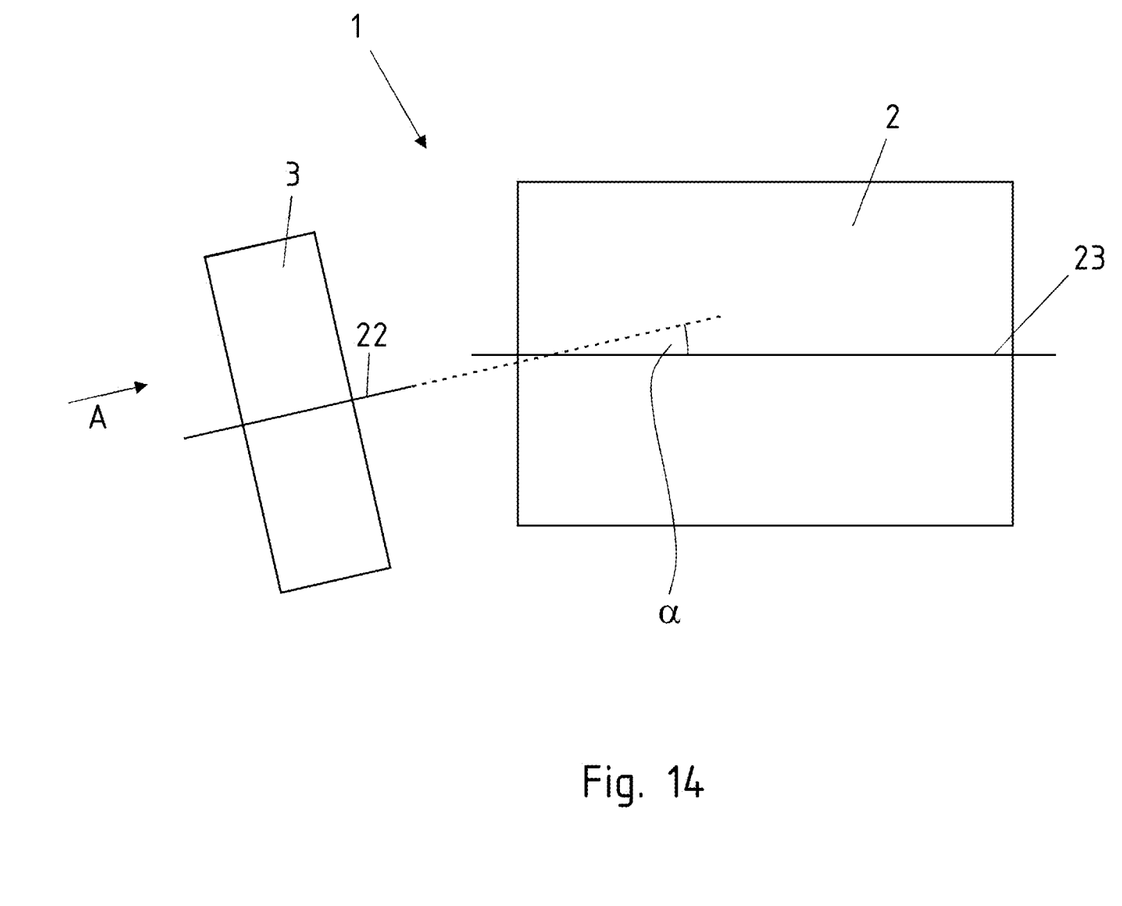
FIG. 14 shows an angled arrangement of the heating element and catalytic converter with respect to one another according to at least one embodiment.

FIG. 14 shows at least one embodiment of the disclosure, according to which an angled arrangement is geometrically decoupled and possible in any desired manner within the scope of this disclosure. To this end, the heating device 3 can be arranged with its longitudinal axis 22 at an angle α of greater than 1 degree with respect to a longitudinal axis 23 of the catalytic converter 2 or the exhaust gas post-treatment component. This gives a greater creative degree of freedom in terms of the path of the exhaust gas system 1, for example, in the underfloor region of the motor vehicle. This arrangement provides for optimum use of the installation space for axle-component transmissions, components or an internal combustion engine. As a result of the physical decoupling of the heating device 3 and exhaust gas post-treatment component, the angled arrangement can be freely selected, as is illustrated in FIG. 14.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. An electric heating device in an exhaust gas system, the electric heating device comprising: an outer circumferential housing; and a rib structure arranged in the housing, wherein the rib structure is heatable in response to an electric current applied thereto, the rib structure comprises a plurality of rib rows parallel to one another in the housing, each rib row of the plurality of rib rows comprises a plurality of ribs, the plurality of rib rows are electrically connected to one another in series or in parallel, wherein two holding rods extend through the plurality of rib rows to hold the plurality of rib rows in place within the housing, and wherein each rib row of the plurality of rib rows has widened regions through which the two holding element extend.

2. The electric heating device according to claim 1, wherein the housing comprises a radially circumferential lateral surface.

3. The electric heating device according to claim 1, wherein the plurality of rib rows are parts of a continuous sheet metal strip.

4. The electric heating device according to claim 1, further comprising an electrically conductive connecting element arranged in a respective end region of each rib row of the plurality of rib rows.

5. The electric heating device according to claim 4, wherein the connecting element comprises a contact plate.

6. The electric heating device according to claim 1, further comprising an electrically insulating spacer arranged in a respective end region of each rib row of the plurality of rib rows.

7. The electric heating device according to claim 6, wherein the spacer is coupled to the housing.

8. The electric heating device according to claim 1, wherein a width of each rib row of the plurality of rib rows varies along an exhaust gas flow direction.

9. The electric heating device according to claim 1, wherein the holding elements comprises a plurality of plug-in sleeves coupled together.

10. The electric heating device according to claim 1, wherein each rib row of the plurality of rib rows comprises an electric conductor plate and a rib plate coupled to the electric conductor plate.

11. The electric heating device according to claim 10, wherein, in each rib row of the plurality of rib rows, fewer of the ribs are arranged in an end region of the rib plate than in a center region of the rib plate, wherein the center region extends over a majority proportion of a length of the rib plate.

12. The electric heating device according to claim 1, wherein the housing is circular.

13. The electric heating device according to claim 4, wherein the connecting element comprises a contact lug.

14. The electric heating device according to claim 4, wherein the connecting element comprises a bracing plate.

15. The electric heating device according to claim 6, wherein the spacer comprises a ceramic plate.

16. The electric heating device according to claim 6, wherein the spacer is coupled to the housing, and the spacer extends partially through the housing.

17. An electric heating device in an exhaust gas system, the electric heating device comprising: an outer circumferential housing; a rib structure arranged in the housing, wherein the rib structure is heatable in response to an electric current applied thereto, the rib structure comprises a plurality of rib rows parallel to one another in the housing, each rib row of the plurality of rib rows comprises a plurality of ribs, a longitudinal axis of the heating device is arranged at an angle of greater than 1 degree with respect to a longitudinal axis of an exhaust gas post-treatment component in an exhaust gas flow direction, wherein two holding rods extend through the plurality of rib rows to hold the plurality of rib rows in place within the housing, and wherein each rib row of the plurality of rib rows has widened regions through which the two holding element extend.

* * * * *